United States Patent
Poirier et al.

(10) Patent No.: US 11,483,576 B2
(45) Date of Patent: Oct. 25, 2022

(54) METHOD AND A DEVICE FOR PICTURE ENCODING AND DECODING

(71) Applicant: InterDigital VC Holdings, Inc., Wilmington, DE (US)

(72) Inventors: Tangi Poirier, Cesson-Sevigne (FR); Philippe Bordes, Cesson-Sevigne (FR); Fabrice Urban, Cesson-Sevigne (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 17/047,248

(22) PCT Filed: Mar. 19, 2019

(86) PCT No.: PCT/US2019/022894
§ 371 (c)(1),
(2) Date: Oct. 13, 2020

(87) PCT Pub. No.: WO2019/199418
PCT Pub. Date: Oct. 17, 2019

(65) Prior Publication Data
US 2021/0168384 A1  Jun. 3, 2021

(30) Foreign Application Priority Data
Apr. 13, 2018 (EP) .................................... 18305457

(51) Int. Cl.
*H04N 19/00* (2014.01)
*H04N 19/184* (2014.01)
*H04N 19/176* (2014.01)

(52) U.S. Cl.
CPC ......... *H04N 19/184* (2014.11); *H04N 19/176* (2014.11)

(58) Field of Classification Search
CPC ...................................................... H04N 19/00
See application file for complete search history.

(56) References Cited

U.S. PATENT DOCUMENTS

| 9,667,942 B2 | 5/2017 | Chen et al. |
| 2015/0381986 A1 | 12/2015 | Chen et al. |
| 2016/0366415 A1 | 12/2016 | Liu et al. |

(Continued)

OTHER PUBLICATIONS

Bordes et al., "Weighted Prediction", Joint Collaborative Team on Video Coding (JCT-VC) of ITU-T SG16 WP3 and ISO/IEC JTC1/SC29/WG11, Document JCTVC-F265, 6th Meeting, Torino, Italy, Jul. 14, 2011, 11 pages.

(Continued)

*Primary Examiner* — Maryam A Nasri
(74) *Attorney, Agent, or Firm* — Condo Roccia Koptiw LLP (57) ABSTRACT

A method for encoding a picture block is disclosed. A predictor is determined as a weighted sum of sample values of a first motion compensated reference block in a first reference image and of a second motion compensated reference block in a second reference image. Then, a residual block determined from the picture block and the predictor is encoded in a bitstream. Advantageously, the weights of the weighted sum are determined by minimizing an error between reconstructed samples neighboring the picture block and samples neighboring the first and second reference blocks.

14 Claims, 5 Drawing Sheets

(56) References Cited

U.S. PATENT DOCUMENTS

2017/0094305 A1    3/2017  Li et al.
2018/0098070 A1\*  4/2018  Chuang ................ H04N 19/137

OTHER PUBLICATIONS

Bordes et al., "Description of SDR, HDR and 360 Video Coding Technology Proposal by Qualcomm and Technicolor—Medium Complexity Version", Joint Video Experts Team (JVET) of ITU-T SG16 WP3 and ISO/IEC JTC1/SC29/WG11, Document JVET-J0022r1, 10th Meeting, San Diego, CA, United States, Apr. 10, 2018, 83 pages.

Hsu et al., "Description of SDR Video Coding Technology Proposal by MediaTek", Joint Video Experts Team (JVET) of ITU-T SG 16 WP3 and ISO/IEC JTC 1/SC 29/WG 11, Document JVET-J0018, 10th Meeting, San Diego, CA, United States, Apr. 10, 2018, 64 pages.

Chen et al., "Generalized Bi-prediction Method for Future Video Coding", 2016 Picture Coding Symposium (PCS), Nuremberg, Germany, Dec. 4, 2016, 5 pages.

Chen et al., "Generalized Bi-Prediction for Inter Coding", Joint Video Exploration Team (JVET) of ITU-T SG 16 WP3 and ISO/IEC JTC 1/SC 29/WG 11, Document JVET-C0047, 3rd Meeting, Geneva, Switzerland, May 26, 2016, 4 pages.

\* cited by examiner

FIGURE 3 - STATE-OF-THE-ART

FIGURE 4 - STATE-OF-THE-ART

METHOD AND A DEVICE FOR PICTURE ENCODING AND DECODING

This application is the national stage entry under 35 U.S.C. § 371 of International Application PCT/US2019/022894, filed Mar. 19, 2019 which was published in accordance with PCT Article 21(2) on Oct. 17, 2019, in English, and which claims the benefit of European Patent Application No. 18305457.6, filed Apr. 13, 2018.

1. TECHNICAL FIELD

The present embodiments generally relate to a method and a device for picture encoding and decoding, and more particularly, to a method and a device for picture encoding and decoding with illumination compensation and bi-prediction.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

A method for encoding a picture block is disclosed. The method comprises:
  determining a predictor as a weighted sum of sample values of a first motion compensated reference block in a first reference image and of a second motion compensated reference block in a second reference image;
  encoding a residual block determined from the picture block and the predictor; wherein the weights of the weighted sum are determined by minimizing an error between reconstructed samples neighboring said picture block and samples neighboring said first and second reference blocks.

A machine readable medium is disclosed. The machine readable medium has stored thereon machine executable instructions that, when executed, implement a method for encoding a picture block, the method comprising:
  determining a predictor as a weighted sum of sample values of a first motion compensated reference block in a first reference image and of a second motion compensated reference block in a second reference image;
  encoding a residual block determined from the picture block and the predictor; wherein the weights of the weighted sum are determined by minimizing an error between reconstructed samples neighboring said picture block and samples neighboring said first and second reference blocks.

An encoding device for encoding a picture block is disclosed. The encoding device comprises:
  means for determining a predictor as a weighted sum of sample values of a motion compensated first reference block in a first reference image and of a second motion compensated reference block in a second reference image;
  means for encoding a residual block determined from the picture block and the predictor;
  wherein the weights of the weighted sum are determined by minimizing an error between reconstructed samples neighboring said picture block and samples neighboring said first and second reference blocks.

An encoding device is disclosed. The encoding device comprises a communication interface configured to access at least a picture block and at least one processor configured to:
  determine a predictor as a weighted sum of sample values of a first motion compensated reference block in a first reference image and of a second motion compensated reference block in a second reference image;
  encode a residual block determined from the accessed picture block and the predictor;
  wherein the weights of the weighted sum are determined by minimizing an error between reconstructed samples neighboring said picture block and samples neighboring said first and second reference blocks.

A bitstream is also disclosed. The bitstream is formatted to include encoded data representative of a block of a picture, the encoded data being encoded according to an encoding method according to one of the above embodiments. A non-transitory processor readable medium having stored thereon the bitstream Advantageously, the reconstructed samples neighboring said picture block and the reconstructed samples neighboring of said first and second reference blocks form a L-shape.

In an embodiment, wherein the weighted sum is further right shifted and wherein the shift S is determined so that the weights are integer values with a precision close to $1/(1<<S)$.

In an embodiment, determining the weights and/or the shift comprises selecting the weights and the shift from a set of defined values.

In an embodiment, determining the weights and/or the shift comprises least square minimization of the error and selection of the weights and of the shift from a set of defined values whose values are the closest from the values obtained by the least square minimization.

In an embodiment, determining the weights and/or the shift comprises computing errors obtained with a set of defined weights and shift values, and selecting the weights and the shift corresponding to the minimal error.

A method for decoding a picture block comprises:
  determining a predictor as a weighted sum of sample values of a first motion compensated reference block in a first reference image and of a second motion compensated reference block in a second reference image;
  decoding the picture block from the predictor and a residual block;
  wherein the weights of the weighted sum are determined by minimizing an error between reconstructed samples neighboring said picture block and samples neighboring of said first and second reference blocks.

A machine readable medium is disclosed. The machine readable medium has stored thereon machine executable instructions that, when executed, implement a method for decoding a picture block, the method comprising:
  determining a predictor as a weighted sum of sample values of a first motion compensated reference block in a first reference image and of a second motion compensated reference block in a second reference image;

decoding the picture block from the predictor and a residual block;

wherein the weights of the weighted sum are determined by minimizing an error between reconstructed samples neighboring said picture block and samples neighboring of said first and second reference blocks.

A decoding device for decoding a picture block is disclosed. The decoding device comprises:

means for determining a predictor as a weighted sum of sample values of a motion compensated first reference block in a first reference image and of a second motion compensated reference block in a second reference image;

means for decoding the picture block from the predictor and a residual block;

wherein the weights of the weighted sum are determined by minimizing an error between reconstructed samples neighboring said picture block and samples neighboring of said first and second reference blocks.

A decoding device is also disclosed. The decoding device comprises a communication interface configured to access at least a stream and at least one processor configured to:

determine a predictor as a weighted sum of sample values of a first motion compensated reference block in a first reference image and of a second motion compensated reference block in a second reference image;

decode a picture block from the predictor and a residual block, said residual being decoded from the accessed stream;

wherein the weights of the weighted sum are determined by minimizing an error between reconstructed samples neighboring said picture block and samples neighboring of said first and second reference blocks.

Advantageously, the reconstructed samples neighboring said picture block and the reconstructed samples neighboring of said first and second reference blocks form a L-shape.

In an embodiment, wherein the weighted sum is further right shifted and wherein the shift S is determined so that the weights are integer values with a precision close to $1/(1<<S)$.

In an embodiment, determining the weights and/or the shift comprises selecting the weights and the shift from a set of defined values.

In an embodiment, determining the weights and/or the shift comprises least square minimization of the error and selection of the weights and of the shift from a set of defined values whose values are the closest from the values obtained by the least square minimization.

In an embodiment, determining the weights and/or the shift comprises computing errors obtained with a set of defined weights and shift values, and selecting the weights and the shift corresponding to the minimal error.

5. DETAILED DESCRIPTION

It is to be understood that the figures and descriptions have been simplified to illustrate elements that are relevant for a clear understanding of the present embodiments, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

Various methods are described below, and each of the methods comprises one or more steps or actions for achieving the described method. Unless a specific order of steps or actions is required for proper operation of the method, the order and/or use of specific steps and/or actions may be modified or combined.

Reference to "one embodiment" or "an embodiment" of the present principles, as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", "at least one of", and "one or more of A, B and C", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

A picture is an array of luma samples in monochrome format or an array of luma samples and two corresponding arrays of chroma samples (or three arrays of tri-chromatic color samples such as RGB) in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments. A tile is an integer number of basic coding units grouped in a square or rectangular region inside a slice or a picture.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably.

Various embodiments are described with respect to the HEVC standard. However, the present embodiments are not limited to HEVC, and can be applied to other standards, recommendations, and extensions thereof, including for example HEVC or HEVC extensions like Format Range (RExt), Scalability (SHVC), Multi-View (MV-HEVC) Extensions and future video coding standards, e.g. those developed by Joint Video Experts Team (JVET). The various embodiments are described with respect to the encoding/decoding of a picture block. They may be applied to encode/decode a whole picture or a whole sequence of pictures.

Figure 1:
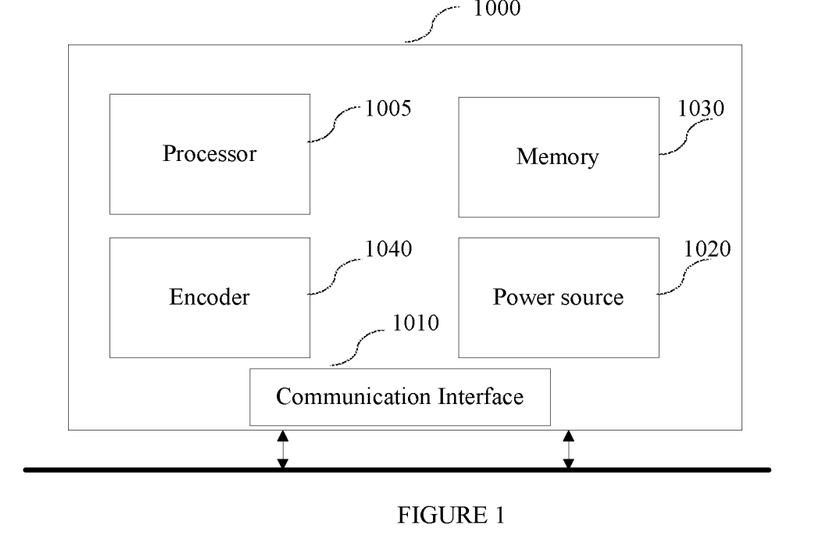
FIG. 1 represents an exemplary architecture of a transmitter configured to encode a picture in a bitstream according to a specific and non-limiting embodiment.

FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIGS. 5 and 6. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 2:
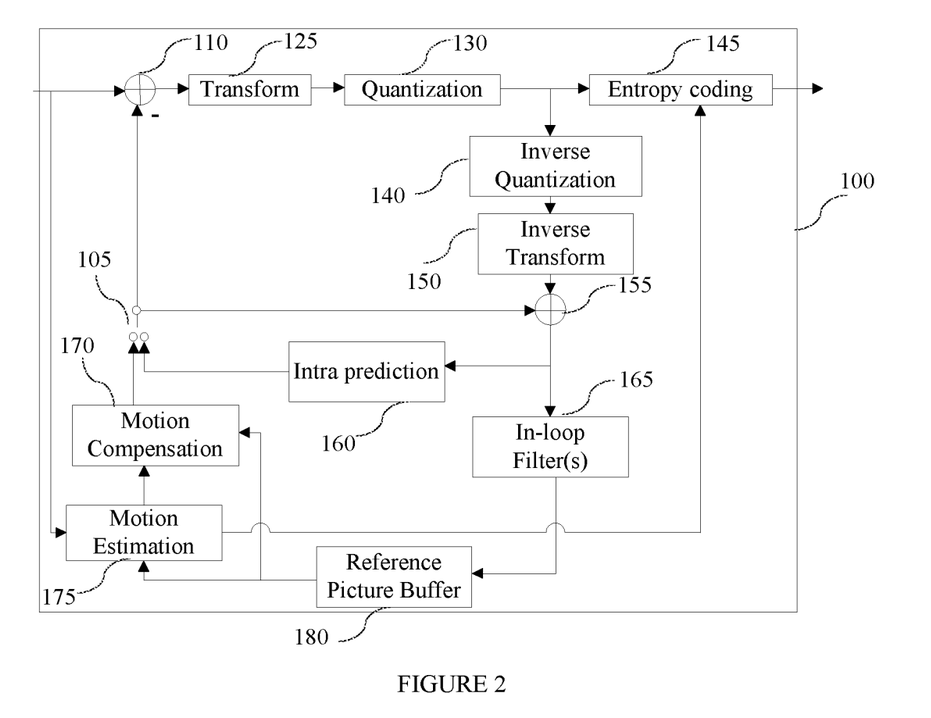
FIG. 2 illustrates an exemplary video encoder adapted to execute the encoding method described with reference to FIGS. 5 and 6.

FIG. 2 illustrates an exemplary video encoder 100, e.g. an encoder of HEVC type, adapted to execute the encoding method described with reference to FIGS. 5 and 6. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest coding tree block (CTB) size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a CU that may be further split into smaller CUs also named sub-CUs or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. There is no partitioning of a CB into PBs and TBs, i.e. a CU is made of a single PU and a single TU.

In the following, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Back to FIG. 2, in the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The motion information (i.e., motion vector and reference index) can be signaled in two methods, namely, "advanced motion vector prediction (AMVP)" and "merge mode". In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference picture index are reconstructed based on the signaled candidate.

The encoder decides (105) which one of the intra mode or inter mode to use for encoding the CU, and indicates the intra/inter decision by a prediction mode flag. Residuals are calculated by subtracting (110) a predicted block (also known as a predictor) from the original picture block.

CUs in intra mode are predicted from reconstructed neighboring samples, e.g. within the same slice. CUs in inter mode are predicted from reconstructed samples of a reference picture stored in a reference picture buffer (180). In Inter mode, bi-prediction combines two predictions pred0 and pred1 obtained via motion compensation (170) of two reconstructed reference blocks:

$$\text{Bi-pred} = w_0 * \text{pred}_0 + w_1 * \text{pred}_1 \quad (1)$$

In addition, the bi-prediction may be combined with block-based Illumination Compensation (IC). IC allows correcting block prediction samples obtained using Motion Compensation (MC) by considering spatial or temporal local illumination variation. In this case, a flag (IC-flag) is encoded for the current block to indicate whether IC correction should be applied or not. The IC-flag may be not encoded but derived from neighboring reconstructed blocks, for example if current block inherits parameters from one neighboring reconstructed block (merge mode).

The residuals are transformed (125) and quantized (130). The quantized transform coefficients, as well as motion vectors and other syntax elements, are entropy coded (145) to output a bitstream. The encoder may also skip the transform or bypass both transform and quantization, i.e., the residual is coded directly without the application of the transform or quantization processes. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

Figure 3:
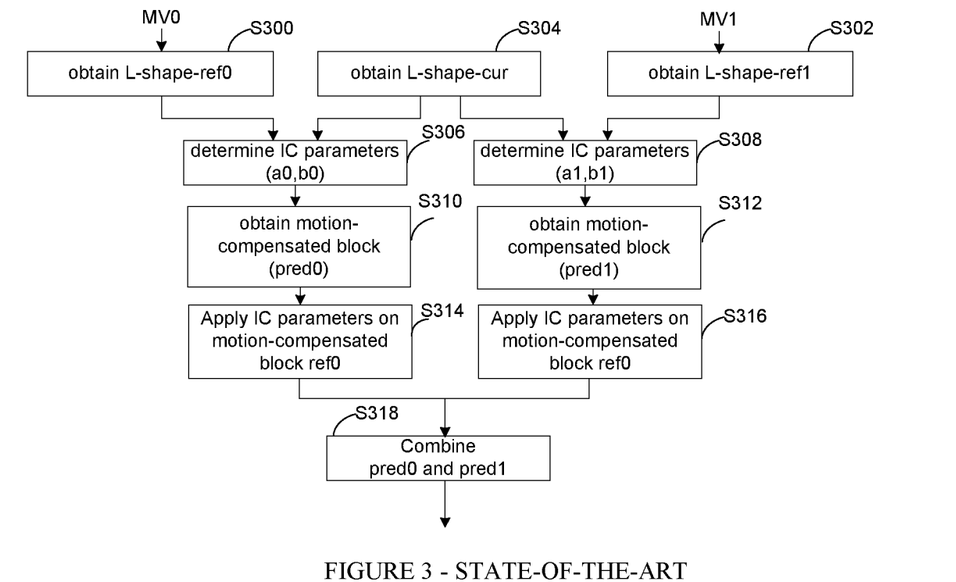
FIG. 3 represents a flowchart of a method for deriving a predictor using bi-prediction and illumination compensation according to the prior art.

FIG. 3 represents a flowchart of a method for deriving a predictor using bi-prediction and illumination compensation according to the prior art.

Illumination Compensation

Figure 4:
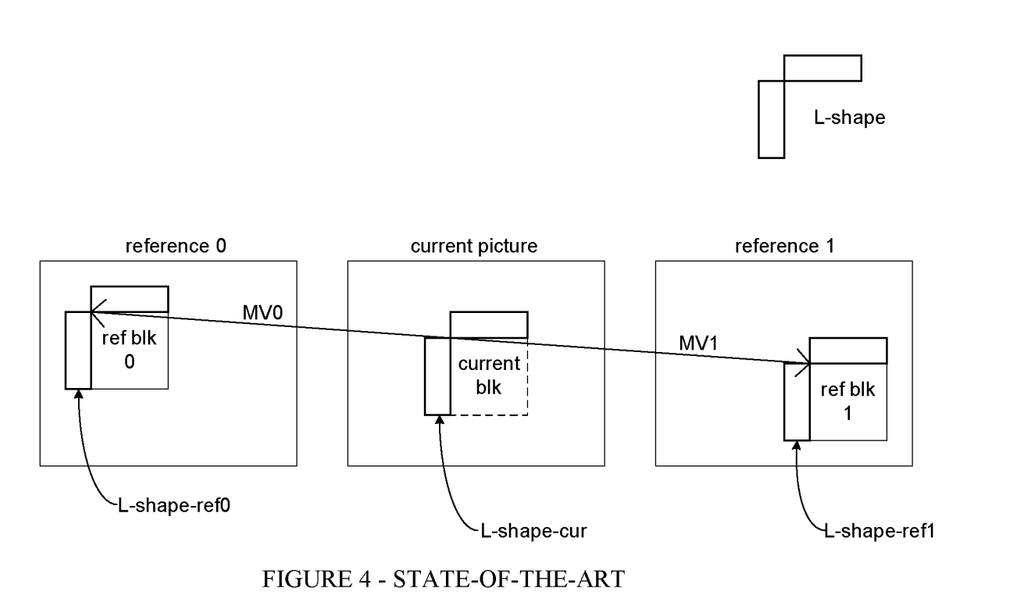
FIG. 4 represents an example of L-shape used for deriving illumination compensation parameters according to the prior art.

In Inter mode, IC allows correcting block prediction samples obtained using MC by considering spatial or temporal local illumination variation. Usually, the IC parameters are determined (S306, S308) by comparing a set $S_{cur}$ of reconstructed neighboring samples (L-shape-cur) to the current block with a corresponding set $S_{ref-i}$ of neighboring samples (L-shape-ref-i) to the reference-i block (i=0 or 1) as depicted in FIG. 4. An example of set of reconstructed neighboring samples (also named L-shape in this document) is depicted in FIG. 4. In this example, the L-shape is composed of one row of samples above and one column of samples left to the current or reference block. In another example, the L-shape may be composed of one row of samples above only, or one column of samples left only, or 2 columns of samples left, etc.

The IC parameters ($a_i$, $b_i$) are computed at step S306 and S308 by minimizing a difference (e.g. using a method of least squares) between the samples in the L-shape-cur and the samples of the L-shape-ref-i corrected with IC parameters. Typically, the IC model is linear: IC(x)=a·x+b, where x is the value of the sample to compensate. The parameters (ai, bi) are determined by solving a least square minimization on the L-shapes:

$$(a_i, b_i) = \underset{(a,b)}{\operatorname{argmin}} \left( \sum_{\substack{x \in L\text{-}shape\text{-}cur, \\ y \in L\text{-}shape\text{-}ref-i}} (x - a \cdot y - b)^2 \right) \quad (2)$$

Finally, $a_i$ is transformed into an integer weight ($a_i$) and a shift ($sh_i$) and $pred_i$ is corrected by IC parameters (S314 and S316) to obtain $predIc_i$ as follows:

$$PredIc_i = (a_i * x_i >> sh_i) + b_i \quad (3)$$

where xi are the samples of the motion compensated block ($pred_i$) determined at step S310 or S312, ">>" is a right-shift operator.

The IC parameters ($a_0, b_0$) and ($a_1, b_1$) are derived independently one of the other. (a0,b0) are derived from L-shape-ref0 (S306) and (a1, b1) are derived from L-shape-ref1 (S308).

Bi-Prediction

The predictors pred0 (or predIc0 if IC is enabled with ref0) and pred1 (or predIc1 if IC is enabled with ref1) are then combined into a single predictor Bi-pred (S318). Traditionally, the combination consists in averaging the two predictions with weights w0=w1=½. More generally, the two predictors pred0 and pred1 are combined in a single predictor as follows:

$$\text{Bi-pred} = (w_0 * pred_0 + w_1 * pred_1 + \text{off}) >> \text{shift} \quad (4)$$

In a variant, the weights w0 and w1 are different. As an example, w0 may be equal to w and w1 equal to (1-w) with pre-defined weight values w listed in Table 1. An index corresponding to the weight value may be encoded in the bitstream for each block.

TABLE 1

| weight value | w | shift |
|---|---|---|
| -¼ | -1 | 2 |
| ¼ | 1 | 2 |
| ⅜ | 3 | 3 |
| ½ | 1 | 1 |
| ⅝ | 5 | 3 |
| ¾ | 3 | 2 |
| ⅝ | 5 | 2 |

The weights may also be derived from global Illumination Compensation, also known as "weighted prediction" (WP) tool. In this case, the weights are determined by the encoder and are constant for a whole slice. They may be transmitted in the bitstream. However, the WP tool is redundant with IC tool so that it is generally counter-productive to activate both WP and IC.

In the bitstream, when IC is enabled for a current slice, picture or sequence, one IC flag may be encoded per block to indicate whether IC is enabled for this block or not. It can also be derived from reconstructed neighboring blocks such as in case of merge mode. When IC is enabled with bi-prediction, two equations (3) are computed independently for each reference 0 and 1, at S314 and S316 respectively. Their results are combined with equation (4) at step S318 as follows:

$$\text{Bi-Pred} = (w0*(a0*x0 >> sh0 + b0) + w1*(a1*x1 >> sh1 + b1) + \text{off}) >> \text{shift} \quad (5)$$

Cascading several shifts may lead to a lack of precision and increases both the number of operations and the memory bandwidth. In case of generalized bi-prediction, the encoder must check all the weights and choose the best one using RD cost (rate-distortion cost) criterion for example. This may slow down the encoder significantly.

Figure 5:
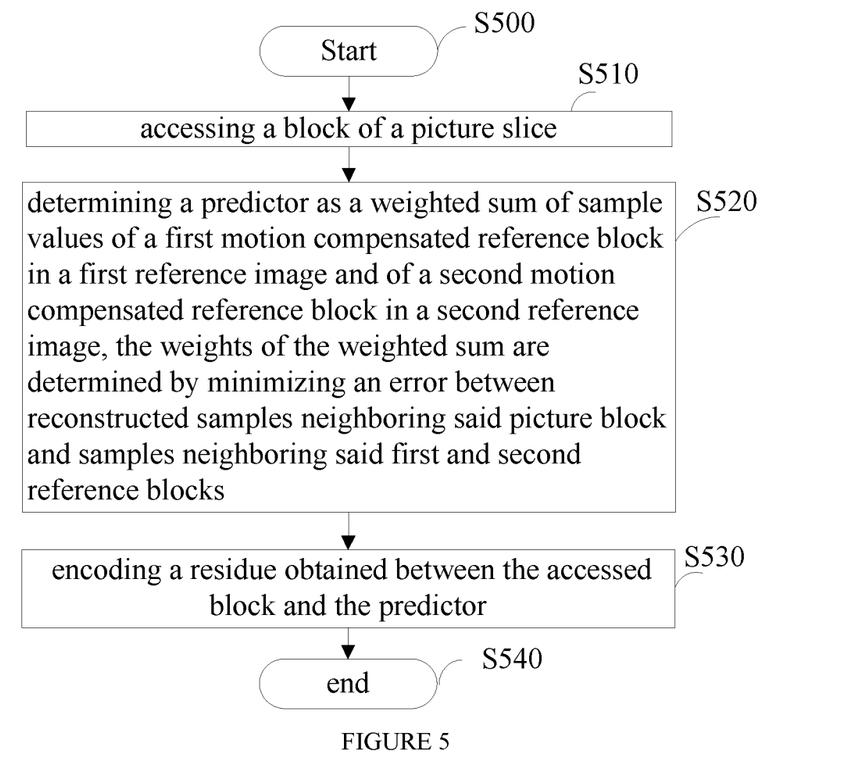
FIG. 5 represents a flowchart of a method for encoding a picture block in a bitstream according to a specific and non-limiting embodiment.

FIG. 5 represents a flowchart of a method for encoding a picture block in a bitstream according to a specific and non-limiting embodiment.

The method starts at step S500. At step S510, a transmitter 1000, e.g. such as the encoder 100, accesses a block of a picture slice. At step S520, a predictor is determined for the accessed block. The predictor is determined as a weighted sum of sample values of a first motion compensated reference block (pred0) in a first reference image and of a second motion compensated reference block (pred1) in a second reference image, the weights of the weighted sum being determined by minimizing an error, namely a difference, between reconstructed samples neighboring said picture block and samples neighboring said first and second reference blocks. Obtaining a weighted sum may comprise adding an offset. A specific embodiment of Step S520 is detailed on FIG. 6.

At step S530, the transmitter encodes the accessed block. Encoding a block usually but not necessarily comprises subtracting the predictor from the block to obtain a block of residuals, transforming the block of residuals into a block of transform coefficients, quantizing the block of coefficients with a quantization step size QP to obtain a quantized block of transform coefficients and entropy coding the quantized block of transform coefficients in the bitstream. Reconstructing a block on the encoder side usually but not necessarily comprises de-quantizing and inverse transforming the quantized block of transform coefficients to obtain a block of residuals and adding the predictor to the block of residuals to obtain a decoded block.

The method ends at step S540.

Figure 6:
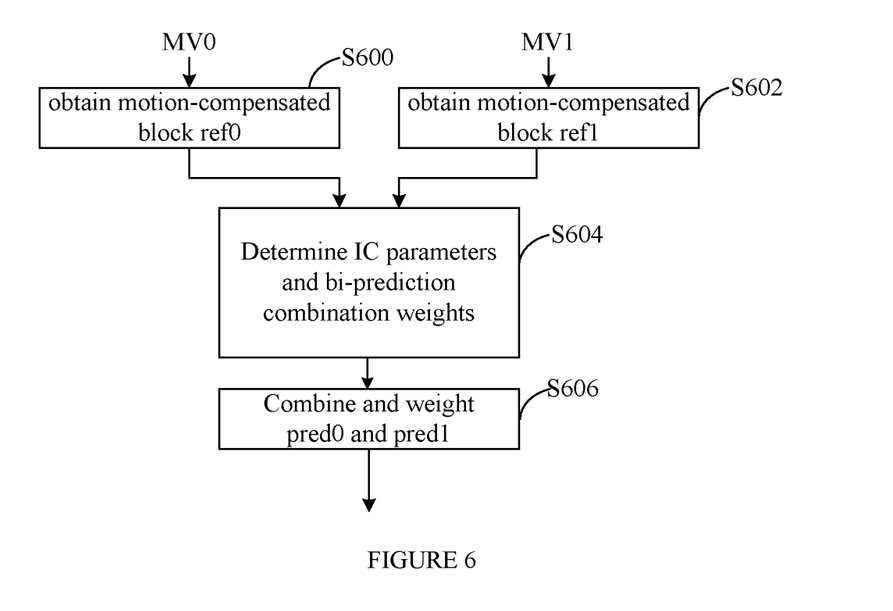
FIG. 6 represents a flowchart for deriving a predictor using bi-prediction and illumination compensation according to a specific and non-limiting embodiment.

FIG. 6 represents a flowchart for deriving a predictor using bi-prediction and illumination compensation according to a specific and non-limiting embodiment.

At step S600, motion compensated reference block ref0 is obtained. It is denoted pred0. At step S602, motion compensated reference block ref1 is obtained. It is denoted pred1. At step S604, combined IC and bi-prediction weights A0, A1, B and S are determined. Values A'0, A'1, B' and S are determined directly by the encoder (and the decoder) using a L-shape of the current block. As an example, A'0, A'1, B' and S are determined using least square method to minimize a quadratic error (7):

$$(A'_0, A'_1, B') = \underset{(A_0, A_1, B)}{\operatorname{argmin}} \left( \sum_{\substack{x \in L\text{-}shape\text{-}cur, \\ y0 \in L\text{-}shape\text{-}ref-0 \\ y1 \in L\text{-}shape\text{-}ref-1}} (x - A'_0 \cdot y_0 - A'_1 \cdot y_1 - B')^2 \right) \quad (7)$$

The value of the shift S being adjusted so that $A_0, A_1, B$ are integer with a desired precision P. For example, with P≈1/(1<<S) (equivalent to fixed point arithmetic with S bits for fractional part):

$$A_0 = E(A'_0 * (1<<S))$$

$$A_1 = E(A'_1 * (1<<S))$$

$$B = E(B'*(1<<S))$$

E(x) denotes the integer part of x.

S can be iteratively reduced while the following conditions are true:

$$|A'_0 - (A_0 >> S)| \le P$$

$$|A'_1 - (A_1 >> S)| \leq P$$

$$|B' - (B >> S)| \leq P$$

In a variant, only predefined values $A_0$, $A_1$, B and S are checked (e.g. the weight values of Table 1) and the parameters ($A'_0$, $A'_1$, B' and S) corresponding to the minimal quadratic error (7) are retained. In this latter case, no method of least squares is used. The weight values of Table 1 may be transmitted in the bitstream (e.g. in the SPS) or are known a-priori. SPS stands for Sequence Parameter Set.

In another variant, the values $A_0$, $A_1$, B and S are computed with a method of least squares and next adjusted so that they match one pre-defined value (e.g. one weight values of Table 1).

In an exemplary embodiment, one flag (generalized bi-prediction flag) is encoded (or decoded on the decoder side) that indicates whether the current block is encoded with the method of FIG. 6 or if the current block is encoded using a regular method. In a variant, this flag and IC-flag are merged into one single flag. In a variant, this flag and generalized bi-prediction flag are merged into one single flag.

At step S606, a final predictor Bi-pred is determined by combining pred0 and pred1 using a weighted sum. In an exemplary embodiment, pred0 and pred1 are combined using the combined weights A0, A1, B and S obtained at step S604. In a specific embodiment, B may be equal to zero. The IC parameters and the prediction weights are applied together in one single step (steps S314, S316 and S318 of FIG. 3 are combined into one single step S604 of FIG. 6). The equation (5) is modified as follows (6):

$$Bi\text{-}Pred = (A0*x0 + A1*x1) + B) >> S \quad (6)$$

if sh0=sh1, with: A0=w0*a0
    A1=w1*a1
    B=(w0*b0+w1*b1+off)<<sh0
    S=shift+sh0
if sh0<sh1, with: A0=(w0*a0)<<(sh1−sh0)
    A1=w1*a1
    B=(w0*b0+w1*b1+off)<<sh1
    S=shift+sh1
if sh0>sh1, with: A0=w0*a0
    A1=(w1*a1)<<(sh0−sh1)
    B=(w0*b0+w1*b1+off)<<sh0
    S=shift+sh0

Figure 7:
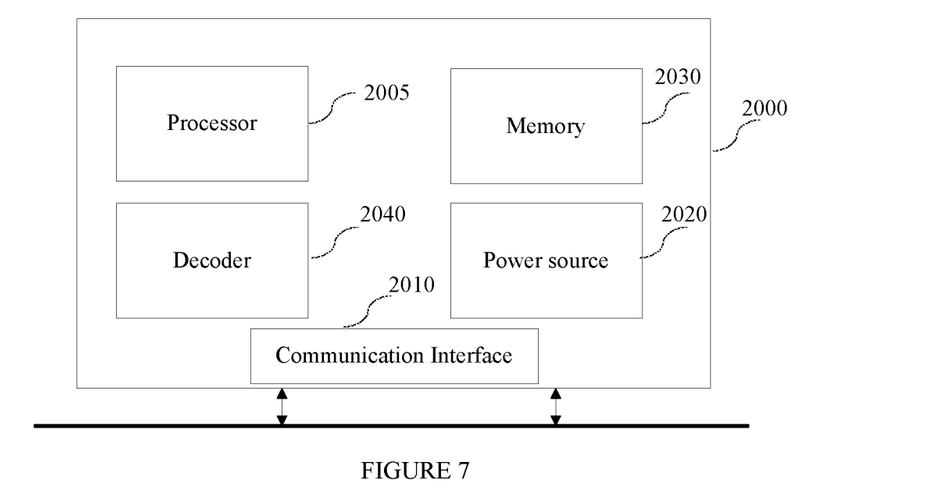
FIG. 7 represents an exemplary architecture of a receiver configured to decode a picture from a bitstream to obtain a decoded picture according to a specific and non-limiting embodiment.

FIG. 7 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIGS. 6 and 9. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:

- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 8:
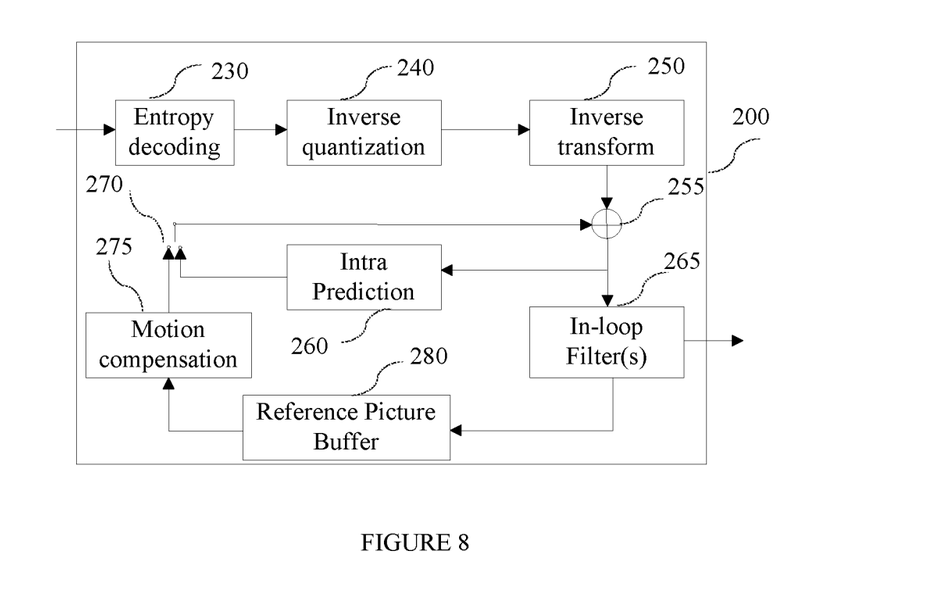
FIG. 8 illustrates a block diagram of an exemplary video decoder adapted to execute the decoding method described with reference to the method of FIGS. 6 and 9.

FIG. 8 illustrates a block diagram of an exemplary video decoder 200, e.g. of the HEVC type, adapted to execute the decoding method described with reference to the method of FIGS. 6 and 9. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted block (also known as a predictor) to obtain a decoded/reconstructed picture block. The predicted block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280).

Figure 9:
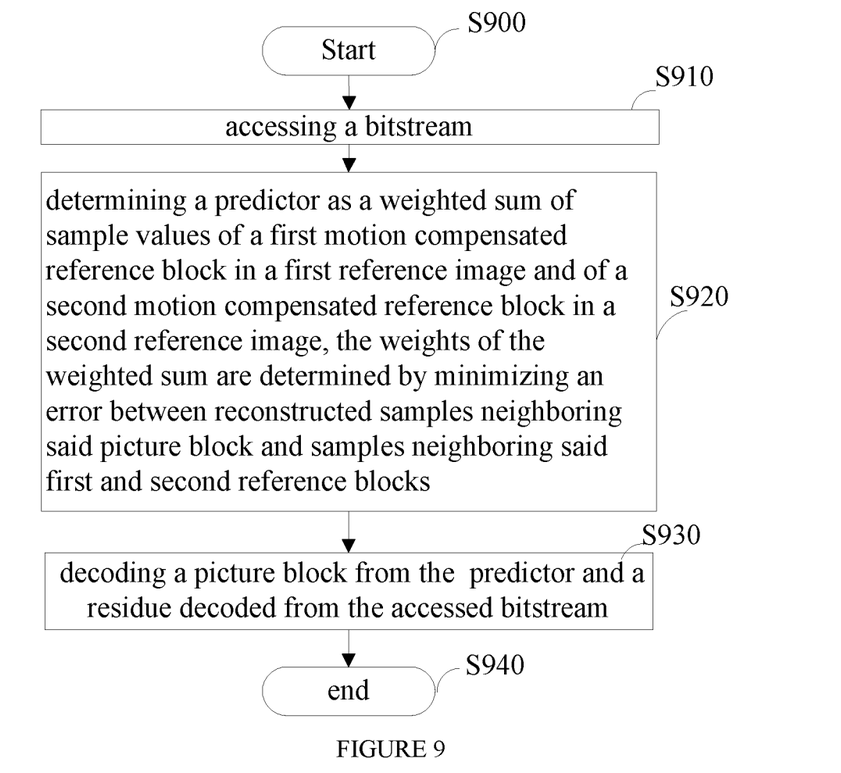
FIG. 9 represents a flowchart of a method for decoding a picture from a bitstream according to a specific and non-limiting embodiment.

FIG. 9 represents a flowchart of a method for decoding a picture from a bitstream according to a specific and non-limiting embodiment.

The method starts at step S900. At step S910, a receiver 2000 such as the decoder 200 accesses a bitstream. At step S920, the receiver determines a predictor as a weighted sum of sample values of a first motion compensated reference block (pred0) in a first reference image and of a second motion compensated reference block (pred1) in a second reference image, the weights of the weighted sum being determined by minimizing an error, namely a difference, between reconstructed samples neighboring said picture block and samples neighboring said first and second reference blocks. Obtaining a weighted sum may comprise adding an offset. A specific embodiment of Step S920 is detailed on FIG. 6 and is identical to S520 of the encoding method.

At step S930, the receiver decodes a block of a picture from the bitstream. Decoding a block usually but not necessarily comprises entropy decoding a portion of the bitstream representative of the block to obtain a block of transform coefficients, de-quantizing and inverse transforming the block of transform coefficients to obtain a block of residuals and adding the predictor to the block of residuals to obtain a decoded block. The method ends at step S840.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a picture block comprising:
   obtaining an illumination compensation prediction mode and a weighted prediction mode for the picture block, the illumination compensation prediction mode comprising obtaining a predictor for a current block by applying an illumination compensation model defined by illumination compensation parameters to a motion compensated reference block, the weighted prediction mode comprising obtaining a predictor for the current block as a weighted sum of two motion compensated reference blocks using weighted prediction parameters;

determining a first motion compensated reference block in a first reference image for the picture block and a second motion compensated reference block in a second reference image for the picture block;

determining weights and an offset value allowing obtaining a weighted sum of the first and second motion compensated reference blocks, the weights and the offset value being representative of the illumination compensation parameters of the illumination compensation prediction mode when the illumination compensation parameters are applied to the picture block based on the first and second motion compensated reference blocks and of the weighted prediction parameters when the weighted prediction mode is applied to the picture block based on the first and second motion compensated reference blocks;

obtaining the weighted sum using the weights and the offset value; and encoding the picture block using the weighted sum as a predictor for the picture block.

2. The method according to claim 1, wherein the weights and the offset value are determined by minimizing a difference between reconstructed samples neighboring said picture block and reconstructed samples neighboring said first and second motion compensated reference blocks.

3. The method according to claim 2, wherein the reconstructed samples neighboring said picture block form a L-shape, the reconstructed samples neighboring said first motion compensated reference block form a L-shape, and the reconstructed samples neighboring said second motion compensated reference block form a L-shape.

4. A non-transitory, computer readable storage medium storing program code instructions for implementing the method of claim 1.

5. A method for decoding a picture block, comprising:

obtaining an illumination compensation prediction mode and a weighted prediction mode for the picture block, the illumination compensation prediction mode comprising obtaining a predictor for a current block by applying an illumination compensation model defined by illumination compensation parameters to a motion compensated reference block, the weighted prediction mode comprising obtaining a predictor for the current block as a weighted sum of two motion compensated reference blocks using weighted prediction parameters;

determining from video data a first motion compensated reference block in a first reference picture for the picture block and a second motion compensated reference block in a second reference picture for the picture block;

obtaining from the video data, weights and an offset value allowing obtaining a weighted sum of the first and second motion compensated reference blocks, the weights and the offset value being representative of the illumination compensation parameters of the illumination compensation prediction mode when the illumination compensation parameters are applied to the picture block based on the first and second motion compensated reference blocks and of the weighted prediction parameters when the weighted prediction mode is applied to the picture block based on the first and second motion compensated reference blocks;

obtaining the weighted sum using the weights and the offset value; and decoding the picture block using the weighted sum as a predictor for the picture block.

6. The method according to claim 5, wherein the weights and the offset value are determined by minimizing a difference between reconstructed samples neighboring said picture block and reconstructed samples neighboring said first and second motion compensated reference blocks.

7. The method according to claim 6, wherein the reconstructed samples neighboring said picture block form a L-shape, the reconstructed samples neighboring said first motion compensated reference block form a L-shape, and the reconstructed samples neighboring said second motion compensated reference block form a L-shape.

8. A non-transitory, computer readable storage medium storing program code instructions for implementing the method of claim 5.

9. A device for encoding a picture block comprising electronic circuitry adapted for:

obtaining an illumination compensation prediction mode and a weighted prediction mode for the picture block, the illumination compensation prediction mode comprising obtaining a predictor for a current block by applying an illumination compensation model defined by illumination compensation parameters to a motion compensated reference block, the weighted prediction mode comprising obtaining a predictor for the current block as a weighted sum of two motion compensated reference blocks using weighted prediction parameters;

determining a first motion compensated reference block in a first reference image for the picture block and a second motion compensated reference block in a second reference image for the picture block;

determining weights and an offset value allowing obtaining a weighted sum of the first and second motion compensated reference blocks, the weights and the offset value being representative of the illumination compensation parameters of the illumination compensation prediction mode when the illumination compensation parameters are applied to the picture block based on the first and second motion compensated reference blocks and of the weighted prediction parameters when the weighted prediction mode is applied to the picture block based on the first and second motion compensated reference blocks;

obtaining the weighted sum using the weights and the offset value; and encoding the picture block using the weighted sum as a predictor for the picture block.

10. The device according to claim 9, wherein the weights and the offset value are determined by minimizing a difference between reconstructed samples neighboring said picture block and reconstructed samples neighboring said first and second motion compensated reference blocks.

11. The device according to claim 10, wherein the reconstructed samples neighboring said picture block form a L-shape, the reconstructed samples neighboring said first motion compensated reference block form a L-shape, and the reconstructed samples neighboring said second motion compensated reference block form a L-shape.

12. A device for decoding a picture block comprising electronic circuitry adapted for:

obtaining an illumination compensation prediction mode and a weighted prediction mode for the picture block, the illumination compensation prediction mode comprising obtaining a predictor for a current block by applying an illumination compensation model defined by illumination compensation parameters to a motion compensated reference block, the weighted prediction mode comprising obtaining a predictor for the current block as a weighted sum of two motion compensated reference blocks using weighted prediction parameters;

determining from video data a first motion compensated reference block in a first reference picture for the picture block and a second motion compensated reference block in a second reference picture for the picture block;

obtaining from the video data, weights and an offset value allowing obtaining a weighted sum of the first and second motion compensated reference blocks, the weights and the offset value being representative of the illumination compensation parameters of the illumination compensation prediction mode when the illumination compensation parameters are applied to the picture block based on the first and second motion compensated reference blocks and of the weighted prediction parameters when the weighted prediction mode is applied to the picture block based on the first and second motion compensated reference blocks;

obtaining the weighted sum using the weights and the offset value; and decoding the picture block using the weighted sum as a predictor for the picture block.

13. The device according to claim 12, wherein the weights and the offset value are determined by minimizing a difference between reconstructed samples neighboring said picture block and reconstructed samples neighboring said first and second motion compensated reference blocks.

14. The device according to claim 13, wherein, the reconstructed samples neighboring said picture block form a L-shape, the reconstructed samples neighboring said first motion compensated reference block form a L-shape, and the reconstructed samples neighboring said second motion compensated reference block form a L-shape.

* * * * *